United States Patent [19]

Kruse

[11] 3,708,237
[45] Jan. 2, 1973

[54] DOWELING JIG
[76] Inventor: Stanley L. Kruse, R.F.D. No. 1, Box 248, Chaplin, Conn. 06235
[22] Filed: July 26, 1971
[21] Appl. No.: 165,486

[52] U.S. Cl. .................408/108, 408/109, 408/115
[51] Int. Cl. ..............................................B23b 49/00
[58] Field of Search......408/109, 108, 115, 103, 241; 33/189, 191

[56] References Cited

UNITED STATES PATENTS

| 3,362,447 | 1/1968 | Elder, Jr. | 408/109 |
| 3,273,426 | 9/1966 | Cleveland | 408/115 X |
| 3,053,121 | 9/1962 | Proctor | 408/108 |

*Primary Examiner*—Gil Weidenfeld
*Attorney*—Louis V. Lucia

[57] ABSTRACT

A Doweling Jig including a work piece clamping device having a pair of work engaging clamping jaws for clamping work pieces to be doweled together, and a drill guide mounted upon said clamping device for locating matched dowel holes to be drilled in said work pieces. The said drill guide being reversible upon said clamping device to locate said holes at identical predetermined distances measured from the opposite sides of said work pieces which are in contact with said jaws, without removing the doweling jig from the work pieces, by simply reversing the position of the drill guide upon said clamping device.

6 Claims, 6 Drawing Figures

PATENTED JAN 2 1973 3,708,237
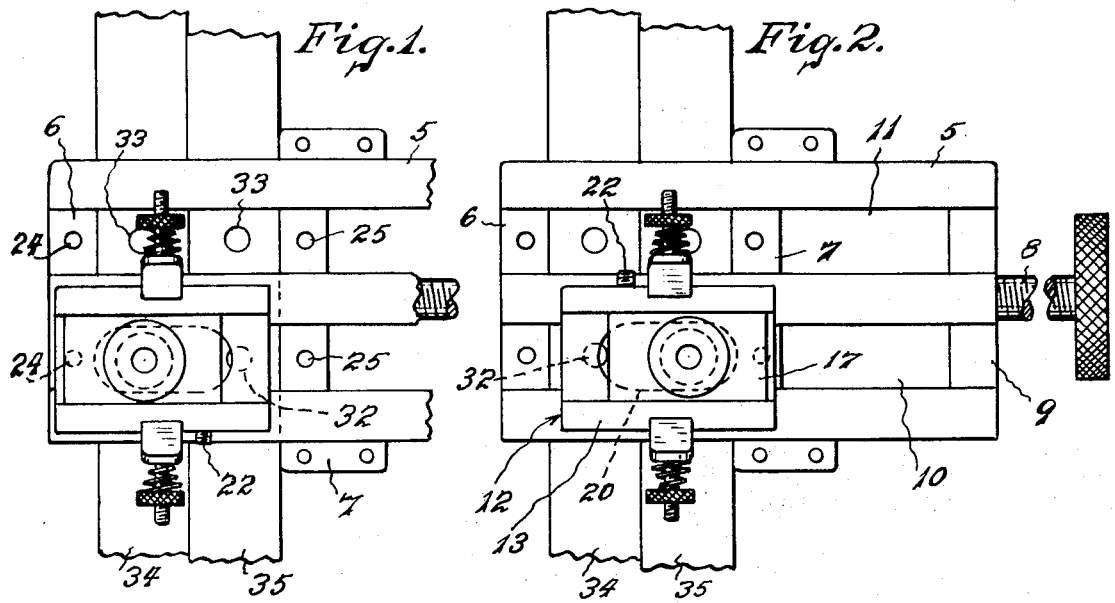
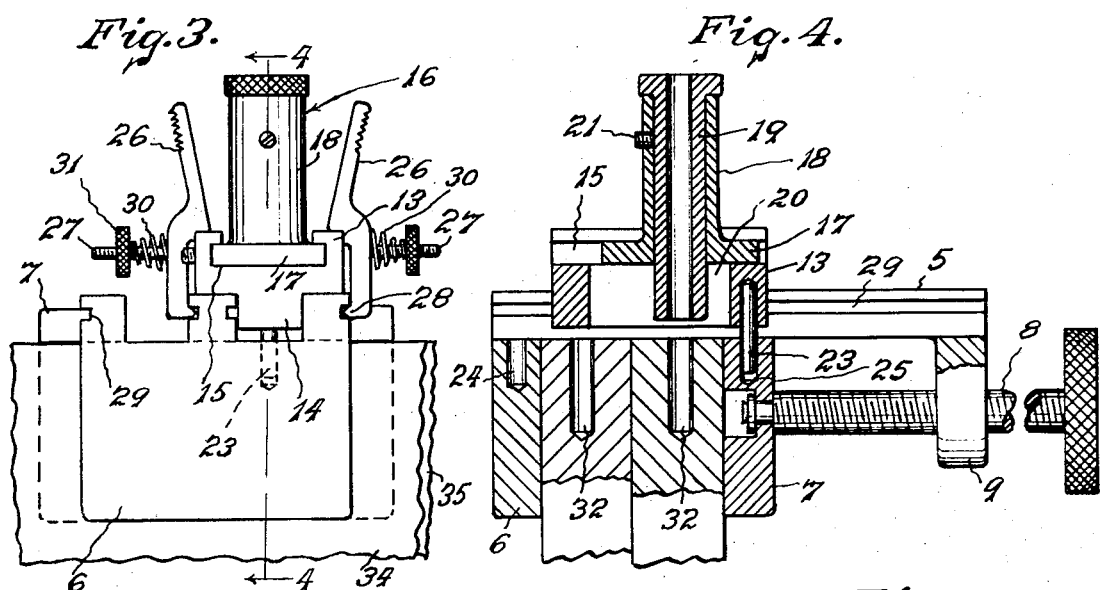
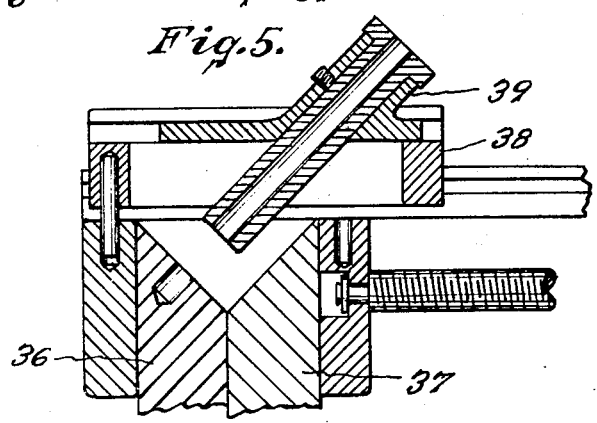
INVENTOR:
STANLEY L. KRUSE
BY Louis V. Lucia
ATTORNEY.

DOWELING JIG

BACKGROUND OF THE INVENTION

Known doweling jigs have drill guides which are adjustable for locating dowel holes in predetermined positions in clamped work pieces, but such drill guides must be adjusted separately for each work piece and they do not measure the location of the holes from the opposite sides of the work pieces without requiring removal of the jig from the work pieces.

SUMMARY OF THE INVENTION

The present invention provides a simple doweling jig which measures the location of matched dowel holes in opposed work pieces from the opposite sides thereof, whereby, when the said work pieces are doweled together, the surfaces on at least one side of the joined pieces are perfectly matched. The general purpose of the invention being to provide for locating dowel holes with maximum accuracy in work pieces which are to be doweled together.

BRIEF DESCRIPTION OF THE INVENTION

FIG. 1 is a plan view in elevation of a portion of a doweling jig embodying the present invention, showing a pair of work pieces clamped together and the adjusted drill guide in position for the drilling of a dowel hole in one of said work pieces.

FIG. 2 is a plan view of said doweling jig showing the adjusted drill guide in reversed position for the drilling of a matching dowel hole in the other work piece.

FIG. 3 is an end view of said drill jig.

FIG. 4 is a sectional side view on line 4-4 of FIG. 3.

FIG. 5 is a similar view of a modified form of the invention.

FIG. 6 is a sectional end view illustrating the matching of the doweled work pieces.

DESCRIPTION OF THE INVENTION

As shown in the drawings, my improved doweling jig includes a clamping device comprising a plate portion 5 having a stationary jaw portion 6 and a movable jaw 7 which is forced into clamping position by means of a clamping screw 8 threaded through a rigid anchor portion 9 depending from the plate portion 5.

The said portion 5 has parallel open ways 10 and 11 therein to receive a guide carriage 12 which includes a base 13 having an elongated depending portion 14 which slidably fits within the ways 10 and 11. Said base 13 also has an undercut slot 15 to slidably receive a drill guide holder 16 having the base 17 with a vertical post 18 thereon which receives a drill guide bushing 19, that extends vertically through a bore in said post, and an elongated slot 20 in the base 13. Said bushing being interchangeable with bushings of other sizes and secured in said post by a set screw 21 and the said drill guide holder is secured in adjusted position in the slot 15 by a set screw 22.

The base 13 has a locating pin 23 projecting downwardly therefrom and adapted to fit into pin receiving holes 24—24 in the stationary jaw 6, and 25—25 in the slidable jaw 7.

In order to hold down the guide carriage 12 in adjusted position within the ways 10 and 11, said carriage is provided with a pair of spring biased retaining jaws 26—26 which are pivotally mounted upon studs 27—27 and each have a prong 28 to engage the slots 29 in the plate portion 5; said jaws being each biased into holding position by a spring 30 which is adjusted tensionwise by a nut 31 that is threaded to the stud 27.

In the use of my improved doweling jig for drilling dowel holes 32—32, and 33—33 in a pair of work pieces 34 and 35, which are to be doweled together, the said work pieces are first clamped together in the correct position, as shown. The proper bushing 19, for the drill to be used, is then inserted into the post 18 and secured therein by the set screw 21. The drill guide carriage 12 is then placed in drill guiding position by inserting it into the respective way 10 or 11 and inserting the locating pin 23 into the respective locating hole 24 or 25, as clearly shown in FIG. 4.

The drill guide holder 16 in then adjusted in the slot 15, for locating the dowel holes 32—32 in the work pieces 34 and 35, by sliding the said holder to the correct position in the carriage 12 and securing it in adjusted position with the screw 21.

After the respective dowel hole 32 is drilled in the work piece 34, with the drill guide in the position shown in FIG. 1., the guide carriage is removed from the way 10 by squeezing the jaws 26—26, reversed, and again inserted in the way 10 and the pin 23 inserted into the hole 24 in the movable jaw 7, as shown in FIGS. 2 and 4.

When the holes 32—32 have been drilled in the work pieces 34 and 35, the guide carriage is removed from the way 10, with the holder 16 in adjusted position thereon, and inserted into the way 11 and the same operation is repeated for drilling the holes 33—33 in said work pieces.

The receiving holes 24—24 and 25—25 are located in their respective clamping jaws 6 and 7 at exactly the same distances from the faces of said jaws, which contact the opposite outer faces of the clamped work pieces 34 and 35, so that the location of the dowel holes is accurately measured from said outer surfaces of the work pieces and thereby providing a perfect matching of at least said outer sides when the work pieces are doweled together, regardless of any difference in the thickness of said work pieces, as illustrated in FIG. 6.

As shown in FIG. 5, my improved doweling jig may also be used for drilling dowel holes in mitered work pieces 36 and 37 by providing a longer guide carriage 38 and an angled guide carrier 39, which may be used exactly in the same manner as above described for the guide holder 16.

I claim:

1. A doweling jig including a plate portion having therein an open way and a stationary clamping jaw and a movable jaw slidable on said plate portion and a screw anchored to said plate portion for moving said movable jaw to clamp a work piece between said jaws, a guide carriage insertable into said way and having a guide member thereon, said carriage being reversible in said way and having a locating projection engageable with reclining means on each of said clamping jaws at equal distances from the opposed surfaces of said clamping jaws which are engageable with said work pieces for locating said guide member at equal predetermined distances from the opposite sides of said work pieces engaged by said jaws.

2. A doweling jig including a plate portion having therein a plurality of open parallel ways and thereunder a stationary jaw portion, a movable jaw slidable on said plate portion and an anchoring portion, a screw threaded to said anchoring portion for moving said movable jaw to clamp together a pair of work pieces between said jaws and crosswise to said ways, a guide carriage insertable in said ways and having thereon a drill guide and a guide locating pin depending therefrom, said carriage being reversable in said ways and each of said jaws having a hole therein at equal distances from their work piece engaging surfaces to receive said guide locating pin and thereby locate said drill guide over said work pieces at equal distances from the surfaces thereof engaged by said jaws.

3. A doweling jig as set forth in claim 2 wherein said drill guide is adjustably mounted upon said carriage with relation to said locating pin.

4. A doweling jig as set forth in claim 2 including a guide holder adjustably mounted upon said carriage, and a drill guide member detachably mounted in said holder.

5. A doweling jig as set forth in FIG. 2 including finger operated hold-down means for detachably retaining said carriage within said ways.

6. A doweling jig as set forth in claim 2 including slots along said ways, and finger operable means engageable with said slots for detachably retaining said carriage within said ways.

* * * * *